Figure 1:
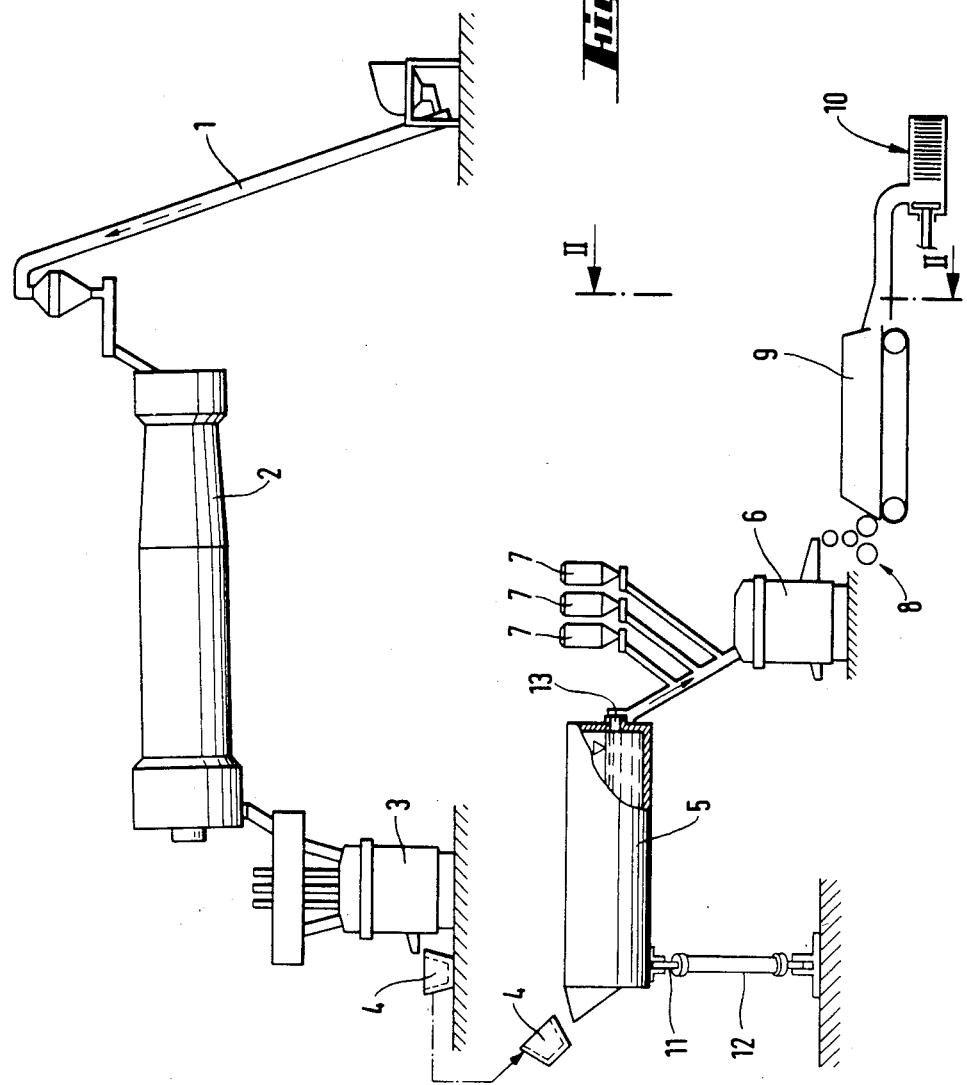

United States Patent [19]

Tuovinen

[11] Patent Number: 4,650,510
[45] Date of Patent: Mar. 17, 1987

[54] METHOD AND APPARATUS FOR MANUFACTURING HEAT-RESISTANT AND/OR FIRE-RESISTANT FIBRE MATERIALS

[75] Inventor: Frans H. Tuovinen, Ulvila, Finland

[73] Assignee: Outokumpu Oy, Helsinki, Finland

[21] Appl. No.: 803,956

[22] Filed: Dec. 2, 1985

[30] Foreign Application Priority Data

Dec. 21, 1984 [FI] Finland ................... 845113

[51] Int. Cl.⁴ .............................. C03B 37/05
[52] U.S. Cl. .............................. 65/8; 65/15; 65/19; 65/141
[58] Field of Search ............ 65/6, 8, 14, 15, 16, 65/19, 141

[56] References Cited

U.S. PATENT DOCUMENTS

| | | | |
|---|---|---|---|
| 2,079,111 | 5/1937 | Edgar et al. | 65/15 X |
| 3,332,758 | 7/1967 | Firnhaber | 65/14 |
| 3,567,413 | 3/1971 | Miller | 65/19 |
| 4,152,131 | 5/1979 | Gagneraud | 65/19 X |
| 4,350,326 | 9/1982 | Fuji et al. | 65/19 X |

FOREIGN PATENT DOCUMENTS 707690 1/1980 U.S.S.R. .

Primary Examiner—Robert Lindsay
Attorney, Agent, or Firm—Dellett, Smith-Hall and Bedell

[57] ABSTRACT

The invention relates to a method for manufacturing heat-resistant and/or fire-resistant fibre materials, when the employed initial material is molten slag from metal processes. According to the invention, the slag holding furnace (5) is used for achieving an essentially even and continuous molten flow from the slag smelting furnace (3) into the mineral wool furnace (6). The invention also relates to an apparatus for realizing the method, wherein the holding furnace (5) is provided with at least one control device (12) which shifts the furnace (5) between the different filling positions in order to ensure an even and continuous flow of molten material.

6 Claims, 2 Drawing Figures

METHOD AND APPARATUS FOR MANUFACTURING HEAT-RESISTANT AND/OR FIRE-RESISTANT FIBRE MATERIALS

The present invention relates to a method and apparatus for manufacturing heat-resistant and/or fire-resistant fibre materials in an electric furnace, while the employed raw materials are molten slags resulting from metal refining processes.

The generally used heat-resistant materials are mineral wools, which are manufactured by means of quick cooling from silicate-containing molten substances, so that the resulting product has a glass-like structure and a temperature resistance generally below 800° C. In addition to silicates, mineral wools contain calcium oxide, aluminium oxide and magnesium oxide. Glass wool and rock wool are different both with respect to their manufacturing technique and their characteristic features. Glass wool, the temperature resistance whereof is below 600° C., has thinner and longer fibres than rock wool, and the specific weight of glass wool may be for instance only a half of the specific weight of rock wool. With acidic glass wools, the heat resistance is mainly limited by the softening and sintering of the fibres, whereas with the more alkaline rock wools, the heat resistance is weakened by their tendency to be crystallized. Glass wool is used for heat insulation and sound-proofing in the building industry, whereas rock wool is a widely used insulation material for industrial furnaces and pipeworks.

Among the fibre materials with a high silicate content are also fire-resistant ceramic fibres, which are manufactured of aluminium oxide, bolus and zirconium oxide. The fibres have a diameter of a few micrometers and a length of 2–20 cm. Moreover, ceramic fibres contain a large amount of micropores, which partly reduce the heat-conducting capacity if their size remains sufficiently small. The temperature resistance of fire-resistant ceramic fibres can rise up to about 1200° C., and these fibres are used for example in the linings of various thermal treatment furnaces.

The manufacturing of heat-resistant and fire-resistant fibre materials is generally carried out in cupola furnaces, which are currently connected with several drawbacks, for instance bad quality control, environmental problems and the rise in the price of coke, which is the principal fuel.

Moreover, cupola furnaces have only a small productive capacity, because the general trend has been to avoid long transportings of the material which requires a lot of space. In that case, however, the molten period in the material production becomes fairly short, which makes quality control difficult, and thus the final product easily becomes non-homogenous.

The present trend, however, is more and more in favour of electric furnaces in the melting of original materials for mineral wools; while using an electric furnace, large feed batches can be treated at the same time, the manufacturing process becomes quicker, the manufacturing costs are reduced and quality control can be arranged more easily than before. In addition to this, the molten volume within an electric furnace can be advantageously adjusted. The use of an electric furnace as such has not, however, eliminated the fact that the feed material in melted in batches, whereas the defibration of mineral wools must be carried out continuously in order to achieve a good final product.

According to the requirements set for mineral wool, the amount of non-fibrous slag particles contained in the final product must be minimized. Moreover, mineral wool must have a sufficient strength to endure packing operations without breaking, as well as good pneumatic flexibility in order to render an adequate insulation capacity per unit of weight. Furthermore, mineral wool must be soft, and the less pulvulent it is in use, the better. Other requirements are mainly connected with the practical uses of mineral wool, such as the length and diameter of the fibres, the heat-conducting capacity, the fire resistance, homogeneity and glass-like nature of the material, as well as its specific weight and chemical resistance.

The object of the present invention is to eliminate the drawbacks of the prior art and to achieve an improved method which is more secure in operation for manufacturing heat-resistant and/or fire-resistant fibre advantageous properties, when the original material is profitably slag received from metal production. The essential novel features of the invention are apparent from the appended patent claims.

In order to advantageously realize the method of the invention, the raw material for mineral wool is, owing to the nature of the process, taken from the process in batches and further transported into the holding furnace before conveying the material into the slag wool furnace proper which is used in producing mineral wool. According to the invention, the holding furnace functions between the material melting furnace, which is operated in batches, and the continuous-action mineral wool furnace, as an evener of the molten flow. Thus the mineral wool production becomes a continuous process which ensures a large capacity and low manufacturing costs per unit. Simultaneously it is possible to arrange the quality control of the final product in an advantageous fashion.

The feeding of the additional components possibly added into the original material of mineral wool can, depending on the particular method of production, be carried out either before the holding furnace or only before the mineral wool furnace. The alloying can profitably take place for instance in the ladle which is employed for shifting the original material from the material melting furnace into the holding furnace of the invention. It is also possible that the additional components are added into an advantagously created, essentially continuous molten flow which flows from the holding furnace into the mineral wool furnace.

Figure 2:
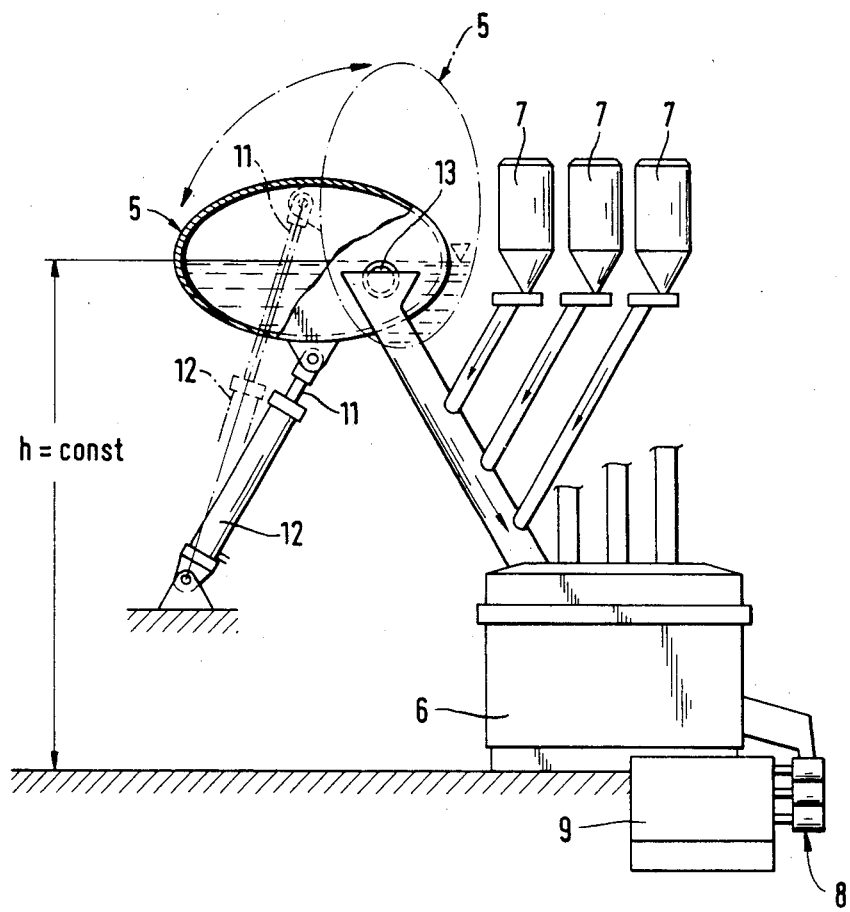

The invention is explained in more detail below with reference to the appended drawings, where FIG. 1 is a schematical illustration of a preferred embodiment of the invention, and FIG. 2 is a partial cross-section and a front view along the line 11—11 of the slag holding furnace of the preferred embodiment of FIG. 1.

According to FIG. 1, the raw material for mineral wool is first conveyed, by means of the vertical conveyor 1, into the preheating furnace 2, and further into the slag smelting furnace 3. The molten slag is conveyed in the ladle 4 into the slag holding furnace 5. The holding furnace 5 is operated so that the slag discharge opening remains at the same spot through the whole process, which thus allows for the essentially continuous flow of mineral wool raw material into the mineral wool furnace 6. The additional components required in the production of mineral wool are also conducted into the mineral wool furnace 6; these components are fed into the furnace 6 from their specific feed silos 7. These components are, depending on the composition of the mineral wool to be produced calcium oxide, aluminium oxide, magnesium oxide, silicon oxide bringing in silicates and preferably zirconium oxide, zinc oxide and titanium oxide, as well as chromium(III)oxide. By means of these additive components, it is possible to adjust the slag viscosity and defibration temperature to be suitable for each mineral wool material. From the mineral wool furnace 6, the molten mineral wool material is conducted onto the mineral wool machine 8, where the defibration is carried out. The resulting product is recovered in the collecting chamber 9, whereafter it is further transported into packing 10 or into further processing.

According to FIG. 2, the holding furnace 5 is supported, by intermediation of the piston 11, to the cylinder 12, which can advantageously be either hydraulic or pneumatic. The cylinder 12 is employed for adjusting the position of the furnace 5 so that the discharge opening 13 of molten slag remains essentially on the same spot, both positionally and with respect to the molten surface, irrespective of the amount of slag contained within the furnace 5. When the furnace 5 is in the position illustrated in FIG. 2, the amount of slag contained in the furnace is essentially large, for example immediately after feeding in the molten batch. Because the manufacturing of mineral wool is essentially carried out in continuous action, the amount of slag contained in the furnace 5 is continuously reduced. In order to maintain the molten surface at the same level as the slag discharge opening 13, the furnace 5 is turned toward the vertical position by means of the cylinder 12 at such a speed that the molten surface remains essentially at a standard height with respect to the discharge opening 13. When a new molten slag batch is fed into the furnace 5, the furnace 5 is lowered, according to the feeding rate, by means of the cylinder 12 back into the position illustrated in FIG. 2. Thus the slag discharge opening 13 remains all the time in an advantageous position with respect to the molten surface, and an even, continuous molten flow is achieved.

By employing the method of the invention is manufacturing mineral wool, an essentially large capacity is achieved, and at the same time the height of the molten surface within the holding furnace can be kept as low as possible and essentially at a standard level in order to realize a profitable heat transfer. Thus it is also possible to maintain the molten surface in the mineral wool furance essentially at a standard level. Moreover, a inclined bottom can be arranged within the holding furnace, so that the furnace can be emptied more easily and practically than before. Furthermore, different linings can be applied to the various parts of the furnace, because in the embodiment illustrated in FIG. 2, only part of the linings get into direct contact with the molten substance. It is also possible to carry out the shifting of the furnace position by means of the cylinder so that two different lower positions for the furnace are used on both sides of the discharge opening, in which case the furnace lining is made essentially identical all over; the wearing of the lining can be reduced by means of this alternative shifting of the furnace position.

Although the above description introduces only one preferred embodiment of the present invention, it is clear that the position and quantity of the equipment belonging thereto can be modified, for example with respect to the equipment facilities required in the production of the original material, without essentially weakening the invention in any way. Furthermore, the shape of the devices belonging to the equipment can be modified in order to create ideal conditions for the manufacturing process.

I claim:

1. An improved method of manufacturing a mineral fiber material, comprising melting slag in a slag melting furnace, withdrawing molten slag from the slag melting furnace at an irregular rate, and delivering the molten slag to a mineral fiber furnace, wherein the improvement resides in that the molten slag is delivered from the slag melting furnace to a slag holding furnace which has a discharge opening through which molten slag is delivered from the slag holding furnace to the mineral fiber furnace, and the position of the slag holding furnace is adjusted so as to maintain the free surface of the molten slag in the slag holding furnace at a constant level relative to the discharge opening so that molten slag is delivered from the slag holding furnace to the mineral fiber furnace in an essentially uniform and continuous flow.

2. Apparatus for manufacturing mineral fiber material, comprising a slag melting furnace for melting slag, a mineral fiber furnace for forming mineral fiber material from molten slag, a slag holding furnace for receiving molten slag at an irregular rate from the slag melting furnace and having a discharge opening for supplying molten slag to the mineral fiber furnace, and means for adjusting the position of the slag holding furnace so as to maintain the free surface of the molten slag in the slag holding furnace at a constant level relative to the discharge opening of the holding furnace so that molten slag may be supplied to the mineral fiber furnace at a substantially uniform rate.

3. Apparatus according to claim 2, wherein the slag holding furnace has a discharge opening for discharging molten slag to the mineral fiber furnace, and the holding furnace is mounted to rotate about the horizontal axis that extends through the discharge opening.

4. Apparatus according to claim 2, wherein the means for adjusting the position of the slag holding furnace comprise a hydraulic cylinder.

5. Apparatus for manufacturing mineral fiber material, comprising a slag melting furnace for melting slag, a mineral fiber furnace for forming mineral fiber material from molten slag, and a slag holding furnace for receiving molten slag from the slag melting furnace and having a discharge opening for supplying molten slag to the mineral fiber furnace, the slag holding furnace being elongate and defining a longitudinal axis that extends substantially horizontally and being of substantially uniform cross-section perpendicular to its longitudinal axis, and the apparatus also comprising means for adjusting the position of the slag holding furnace by rotating the slag holding furnace about an axis that is parallel to the longitudinal axis of the slag holding furnace but is spaced therefrom, said discharge opening lying on the axis of rotation of the slag holding furnace.

6. Apparatus according to claim 4, wherein the means for adjusting the position of the slag holding furnace comprise a hydraulic cylinder.

* * * * *